US011840290B2

United States Patent
Onishi et al.

(10) Patent No.: US 11,840,290 B2
(45) Date of Patent: Dec. 12, 2023

(54) ELECTRIC POWER STEERING DEVICE

(71) Applicant: Mitsubishi Electric Corporation, Tokyo (JP)

(72) Inventors: Yoshihiko Onishi, Tokyo (JP); Toyoaki Udo, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 14 days.

(21) Appl. No.: 16/496,653

(22) PCT Filed: Apr. 4, 2017

(86) PCT No.: PCT/JP2017/014032
§ 371 (c)(1),
(2) Date: Sep. 23, 2019

(87) PCT Pub. No.: WO2018/185825
PCT Pub. Date: Oct. 11, 2018

(65) Prior Publication Data
US 2021/0107558 A1 Apr. 15, 2021

(51) Int. Cl.
*H02K 11/33* (2016.01)
*B62D 5/04* (2006.01)
(Continued)

(52) U.S. Cl.
CPC .............. *B62D 5/04* (2013.01); *H02K 5/1732* (2013.01); *H02K 7/083* (2013.01); *H02K 9/227* (2021.01);
(Continued)

(58) Field of Classification Search
CPC .......... B62D 5/04; H02K 24/00; H02K 7/083; H02K 5/1732; H02K 9/227; H02K 11/33; H02K 11/225
(Continued)

(56) References Cited

U.S. PATENT DOCUMENTS

2013/0249335 A1  9/2013  Motoda
2015/0171709 A1  6/2015  Ito et al.
(Continued)

FOREIGN PATENT DOCUMENTS

| CN | 204733003 U |   | 10/2015 |             |
|----|-------------|---|---------|-------------|
| DE | 102015214474 | * | 2/2016 | ............. H02K 11/33 |

(Continued)

OTHER PUBLICATIONS https://www.google.com/search?q=semi-circular+thesaurus&rlz=1C1GCEB_enUS792US792&oq=semi-circular+thesaurus&aqs=chrome.. 69i57j0i22i30j0i390i65014.9033j0j1&sourceid=chrome&ie=UTF-8.*

(Continued)

*Primary Examiner* — Terrance L Kenerly
(74) *Attorney, Agent, or Firm* — Sughrue Mion, PLLC; Richard C. Turner

(57) ABSTRACT

In an electric power steering device in which a control unit and a motor are integrated, when the control unit is housed in a case, although a frame, by which the motor and the control unit are compartmentalized, is required, there have been problems in that the case is deformed by a pressure which influences the case when the frame is provided, and a position accuracy of a shaft center of a rotation shaft of the motor is worsened. Therefore, in order to reduce a deformation of the case, a step portion is provided at an inner wall surface of the case and the frame is contacted to the step portion, and moreover, a connecting portion is provided between an outer circumference portion of the frame and an inner circumference portion of the case, whereby a movement of the frame is restrained.

9 Claims, 3 Drawing Sheets

(51) Int. Cl.
  *H02K 11/225* (2016.01)
  *H02K 9/22* (2006.01)
  *H02K 5/173* (2006.01)
  *H02K 7/08* (2006.01)
  *H02K 24/00* (2006.01)

(52) U.S. Cl.
  CPC ........... *H02K 11/225* (2016.01); *H02K 11/33* (2016.01); *H02K 24/00* (2013.01)

(58) Field of Classification Search
  USPC .......................................................... 310/64
  See application file for complete search history.

(56) References Cited

U.S. PATENT DOCUMENTS

| | | | |
|---|---|---|---|
| 2016/0036299 A1 | 2/2016 | Hayashi | |
| 2016/0181885 A1 | 6/2016 | Yamasaki | |
| 2017/0066470 A1 | 3/2017 | Asao et al. | |
| 2018/0026492 A1 | 1/2018 | Takizawa et al. | |
| 2018/0123431 A1* | 5/2018 | Kawaguchi | H01L 25/18 |
| 2018/0127020 A1 | 5/2018 | Asao et al. | |

FOREIGN PATENT DOCUMENTS

| | | |
|---|---|---|
| EP | 2 892 130 A1 | 7/2015 |
| JP | H04222432 A | 8/1992 |
| JP | 2004229468 A | 8/2004 |
| JP | 2016-119799 A | 6/2016 |
| JP | 2016-136829 A | 7/2016 |
| JP | 2016-201904 A | 12/2016 |
| WO | 2015/198476 A1 | 12/2015 |
| WO | 2016163037 A1 | 10/2016 |
| WO | 2016166796 A1 | 10/2016 |

OTHER PUBLICATIONS

Communication dated Jul. 7, 2020 by the Japanese Patent Office in Application No. 2019-510524.
Brief summary of the office action/search report from Hoffmann Eitle dated Oct. 8, 2020, in application No. 17 904 805.3.
Communication dated Oct. 6, 2020, issued by the European Patent Office in application No. 17 904 805.3.
International Search Report for PCT/JP2017/014032 dated Jun. 20, 2017 [PCT/ISA/210].
Communication dated Jan. 22, 2021, from the Indian Patent Office in European Application No. 201947036661.
Communication dated Apr. 21, 2020, issued by the Japan Patent Office in application No. 2019-510524.
Communication dated Sep. 24, 2020 by the National Intellectual Property Office of the People's Republic of China in application No. 201780088767.6.
Communication dated Feb. 21, 2020, from the European Patent Office in application No. 17904805.3.
Communication dated Jul. 14, 2021 from the China National Intellectual Property Administration in CN application No. 201780088767.6.
Communication dated May 14, 2021, from the China National Intellectual Property Administration in application No. 201780088767.6.
Communication dated Feb. 26, 2021 from The State Intellectual Property of the P.R. of China in Application No. 201780088767.6.
Communication dated Nov. 3, 2021, issued by the National Intellectual Property Office of the P.R.C. in application No. 201780088767.6.
Communication dated Apr. 28, 2022 from the National Intellectual Property Office of the People's Republic of China in Application No. 201780088767.6.
Extended European Office Action dated Mar. 9, 2023 in European Application No. 17904805.3.

* cited by examiner

ELECTRIC POWER STEERING DEVICE

CROSS REFERENCE TO RELATED APPLICATIONS

This application is a National Stage of International Application No. PCT/JP2017/014032 filed Apr. 4, 2017.

TECHNICAL FIELD

The present invention relates to an electric power steering device, and particularly relates to an electric power steering device in which a control unit is housed in a case of a motor, and the control unit is integrated to the motor.

BACKGROUND ART

In an electric power steering device, because there have been needs in which a space-saving process is realized and a weight reduction is realized, a motor and a control unit, which are conventionally separated, are integrated, and the electric power steering device is formed as a more compact device. The motor and the control unit are integrated, whereby a harness, which is required for a wiring by which each of the motor and the control unit is connected, can be reduced, so that a loss, which is caused by the harness, is not caused and efficiency is improved. Moreover, not only an influence of a noise which invades from the wiring can be reduced but also a man-hour, which is required for assembling a product, can be omitted, so that a cost reduction can be realized.

However, the control unit is composed of an electronic instrument, so that it is required that an influence of dust is not received to the control unit. In contrast to the control unit, the motor is formed as a mechanical structure, and there is a possibility in which the dust is caused. Therefore, in this kind of the electric power steering device, the control unit is provided at a part of a case of the motor, and the electric power steering device is configured in such a way that the control unit is installed to the motor, and a rotor housing is arranged between the motor and the control unit, and a wall, by which both of the motor and the control unit are separated, is formed. In a concrete method, a simple work is performed in order to shorten a working process, and the electric power steering device is configured as simple as possible in order to save space. In other words, as described in Patent Document 1, spring mechanisms are provided at a plurality of positions of a circumferential surface of a rotor housing which is contacted to the case of the motor, and the rotor housing is pressed and inserted to the case of the motor, whereby the above-described spring mechanisms performs that an elastic force in a diameter direction is acted to an inner wall surface of the case of the motor.

CONVENTIONAL ART DOCUMENT

Patent Document

Patent Document 1: Japanese Laid-Open Patent Publication No. 2016-136829

SUMMARY OF THE INVENTION

Problems to be Solved by the Invention

In an electric power steering device which has a configuration which is disclosed in Patent Document 1, when a stator is pressed and inserted to a housing of a motor and a rotor housing is also similarly pressed and inserted, a deformation of the housing of the motor is caused, so that a force for pressing and inserting is distributed in accordance with an expansion and a contraction of a plurality of spring mechanisms which is provided at the rotor housing, whereby the deformation is inhibited. Although a problem, in which the deformation of the housing, which is caused when the stator is pressed and inserted to the housing, must be inhibited, is resolved by shock absorption, which is realized by using the spring mechanisms, of the rotor housing and the case of the motor, a problem, in which an axis center of the motor is not evenly maintained, is caused as a new problem. In other words, when a plurality of spring mechanisms is used, a possibility, in which a deformation of each of the spring mechanisms is evenly set, is low, and it is difficult that a correct axis center is secured. Therefore, there is a possibility in which the plurality of spring mechanisms causes a vibration or a noise.

The present invention has been made to solve the new problem in a state where attention is focused on the new problem, and an object of the invention is to provide an electric power steering device in which a pressure to a case of a motor, which is caused when a component is pressed and inserted, can be inhibited, and an accuracy of an axis center can be also secured.

Means for Solving Problems

An electric power steering device of the present invention includes a case; a motor which is housed in the case; a control unit which is housed in the case; and a frame which compartmentalizes the motor and the control unit; wherein a movement of the frame is restrained by using a step portion, which is provided at an inner wall surface of the case in a state where a corner portion of the frame is contacted to the step portion, and a connecting portion at which an outer circumference of the frame and an inner circumference of the case are fixed and bonded.

Effects of the Invention

According to the electric power steering device of the present invention, a pressing and inserting force is inhibited with respect to a frame which is arranged at an upper portion of a stator of a case of a motor so as to hold a bearing at a central position, and a diameter of an outer circumference, which is contacted to an inner wall of the case, is included, and a connecting portion is provided near the outer circumference, so that an outer circumference of the frame and an inner circumference of the case are strongly fixed and bonded, whereby a movement of the frame is restrained, so that an accuracy of an axis center can be secured in a state where the pressing and inserting force is inhibited.

MODE FOR CARRYING OUT THE INVENTION

Embodiment 1

Figure 1:
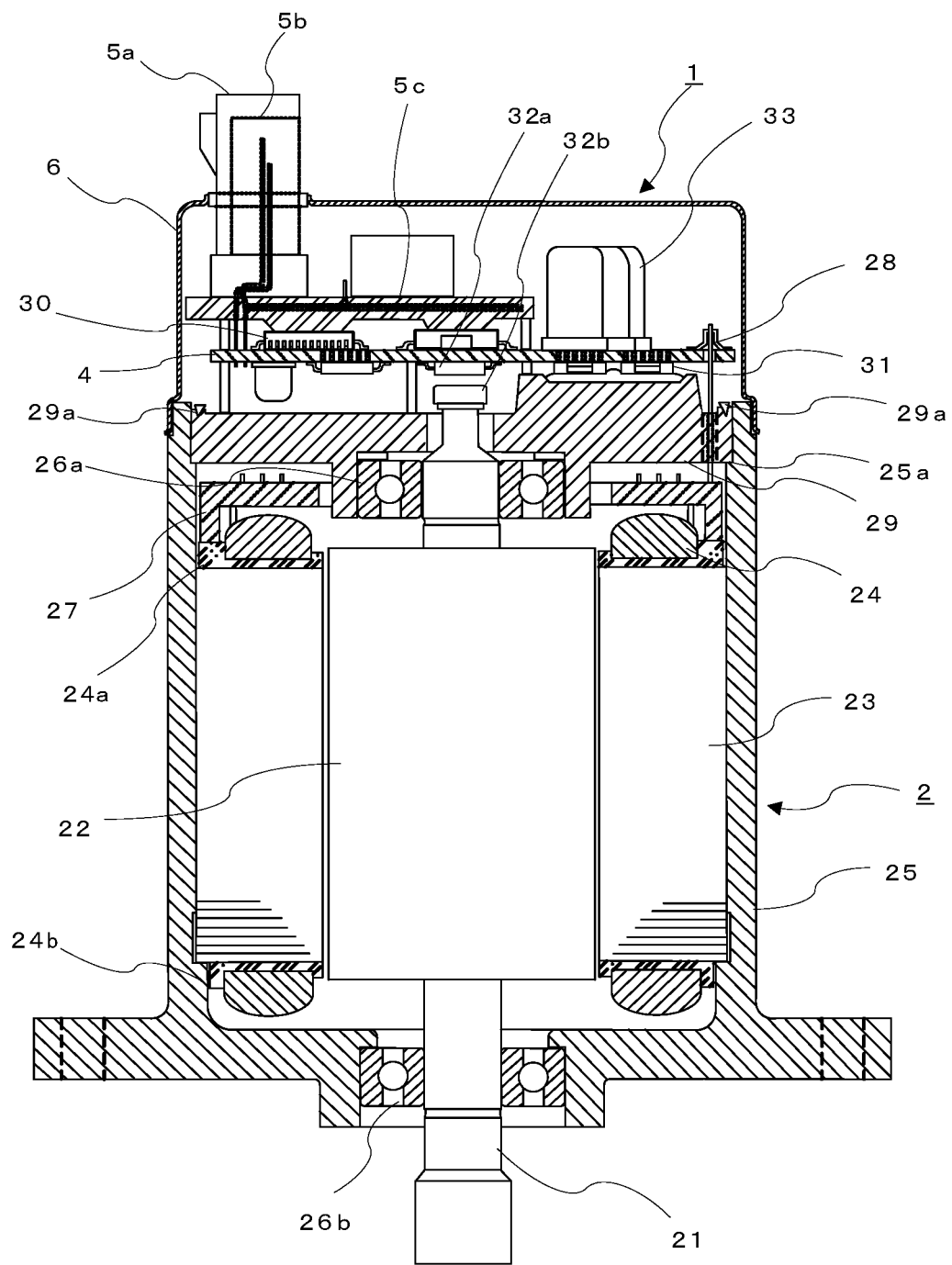
FIG. 1 is a cross-sectional diagram which indicates an electric power steering device according to Embodiment 1.

Hereinafter, an electric power steering device according to Embodiment 1 of the present invention will be explained in accordance with the drawings.

In the electric power steering device, a control unit 1 is arranged at an opposite side with respect to an output shaft 21 of a motor 2 so as to be integrated. The motor 2 is formed as a motor having a multi-phase winding, and the motor 2 is composed of the output shaft 21, a rotor 22, and a stator 23, which are installed in a case 25. A plurality of permanent magnets are arranged in pairs around the rotor 22, and a multi-phase winding 24 is wound around a bobbin 24*a* and a bobbin 24*b* so as to be arranged at the stator 23.

An end portion of the winding 24, which is wound around the stator 23, is linked to an annular terminal portion 27 which is arranged near an upper portion of the winding 24, and after that, the end portion is linked to the control unit 1. Moreover, in order to hold the output shaft 21 in a free rotation state, a first bearing 26*a* and a second bearing 26*b* are provided at both of end portions of the output shaft 21. Moreover, the first bearing 26*a* is arranged at a central position of a frame 29, and the frame 29 is provided at a boundary between the motor 2 and the control unit 1, and the frame 29 is used as a cap with respect to the motor 2.

On the other hand, the control unit 1 is arranged in a coaxial state with respect to the motor 2, and a control substrate 4, which is installed in a cover 6, is arranged, and moreover, a first connector 5*a* and a second connector 5*b* are arranged at an upper end portion. Many electronic components, a CPU 30, a switching element 31, a capacitor 33 and the like, are mounted on the substrate 4. An electric power source signal and an information signal, which are inputted from the first connector 5*a* and the second connector 5*b*, are passed through a terminal, and are linked to the control substrate 4, via a relay component 5*c*, and to the switching element 31. A coil wire 28, which is extended and outputted from an end portion of the winding 24 of the motor 2, is extended toward an upper position, and the coil wire 28 is connected to an output terminal of the switching element 31 of the control substrate 4, so that an electric current is supplied to the winding 24 of the motor 2, and the electric current acts in such a way that the output shaft 21 is rotated. The frame 29 includes a hole which penetrates at a position which is separated, with a predefined insulation distance, from the coil wire 28, and a part of the frame 29 is adjacent to the switching element 31 and the like. The frame 29 is used as a heat sink by which heat, which is generated from the switching element 31, is radiated. In particular, when the frame 29 is configured as the heat sink, the frame 29 is used as a required component, by which a problem of the heat is resolved, in the electric power steering device, and the frame 29 takes charge of resolving the problem of the heat, whereby the frame 29 is effective when the overall electric power steering device is downsized. Moreover, a hole is formed at a central portion of the frame 29, and the output shaft 21 penetrates in the hole, and a magnet rotor 32*b* is disposed at a tip of the output shaft 21. On the other hand, a sensor 32*a* is mounted on a portion, which is faced to the magnet rotor 32*b*, of the control substrate 4, and a rotation of the magnet rotor 32*b* is detected by using the sensor 32*a*, whereby the electric power steering device is configured in such a way that a rotation angle and a rotation velocity of the output shaft 21 can be detected. In other words, a rotation sensor portion is provided, by using the magnet rotor 32*b* and the sensor 32*a*, at the tip of the output shaft 21.

Main contents of the motor 2, such as the stator 23, the rotor 22, and the output shaft 21, are housed in the case 25 of the motor 2. When the main contents are housed in the case 25, it is required that the inner surface of the case 25 and an outer circumference of the stator 23 are strongly fixed in such a way that the main contents, which are the stator 23 and the like, are pressed and inserted or the main contents are burned and fitted to an inner surface of the case 25. Therefore, there is a possibility in which the case 25 is slightly bulged and contorted by pressing and inserting the main contents. On the other hand, the frame 29 is used not only as a cap but also as a component for holding the first bearing 26*a*, and the frame 29 greatly influences an accuracy of a shaft center of the output shaft 21. Therefore, a concave portion, which includes a step portion 25*a*, is formed at an inner wall surface of the case 25 in such a way that the concave portion is contacted to an outer circumference of the frame 29 so as to hold a corner portion of the frame 29. The case 25 is made, for example, of aluminum, and the step portion 25*a* is cut so as to be formed.

On the other hand, the frame 29 hold the first bearing 26*a* in a state where an accuracy of an axis center of the first bearing 26*a* is held, and in order to dissipate heat which is generated at the switching element 31 or the like, an aluminum material, which has an excellent heat transfer capability, is used for the frame 29. Although a movement in an axis direction (a lower direction in FIG. 1) of the frame 29 is restrained by using the step portion 25*a* of the case 25, it is required that a holding force is secured in such a way that the frame 29 does not shift, in an upper direction and in a circumference direction, in accordance with an usage environment such as a vibration or a heat impact. In order to secure the holding force, if a pressure and insertion force for the case 25 is enhanced, doubtful adhesion or the like is caused when the electric power steering device is assembled, and the case 25 is deformed, whereby a position accuracy of the frame 29 is not realized, and moreover, when the frame 29 is shifted, in an upper direction, with respect to the case 25, a gap between a rotation sensor and the frame 29 is varied, and an angle detection accuracy is lowered. Furthermore, when the frame 29 is shifted in a circumference direction, an insulation distance between the frame 29 and the coil wire 28 is lower than or equal to a predefined distance, whereby a problem, such as an electric current leakage, is caused. In order to resolve the above-described problems which are caused in accordance with a position deviation of the frame 29, in the electric power steering device according to Embodiment 1, even when a holding force, which is caused by pressing and inserting the frame 29, is lowered, a caulking 29*a* is provided at a plurality of positions near an outer circumference at an upper side of the frame 29, and an outer circumference of the frame 29 and an inner circumference of the case 25 are strongly fixed and bonded, whereby shift operations of the frame 29 in an upper direction and in a circumference direction are also restrained.

In addition, in this case, the caulking represents that a part of a material is crushed so as to connect components of which a number is greater than or equal to two, and a process for providing the caulking represents that a connecting portion is formed at the components. In Embodiment 1, the electric power steering device has a configuration in which the caulking 29*a* is provided from the inside of the case 25 in such a way that the case 25 and the frame 29 can be fixed in a state where the case 25 and the frame 29 are arbitrarily positioned in an axis direction.

Figure 2:
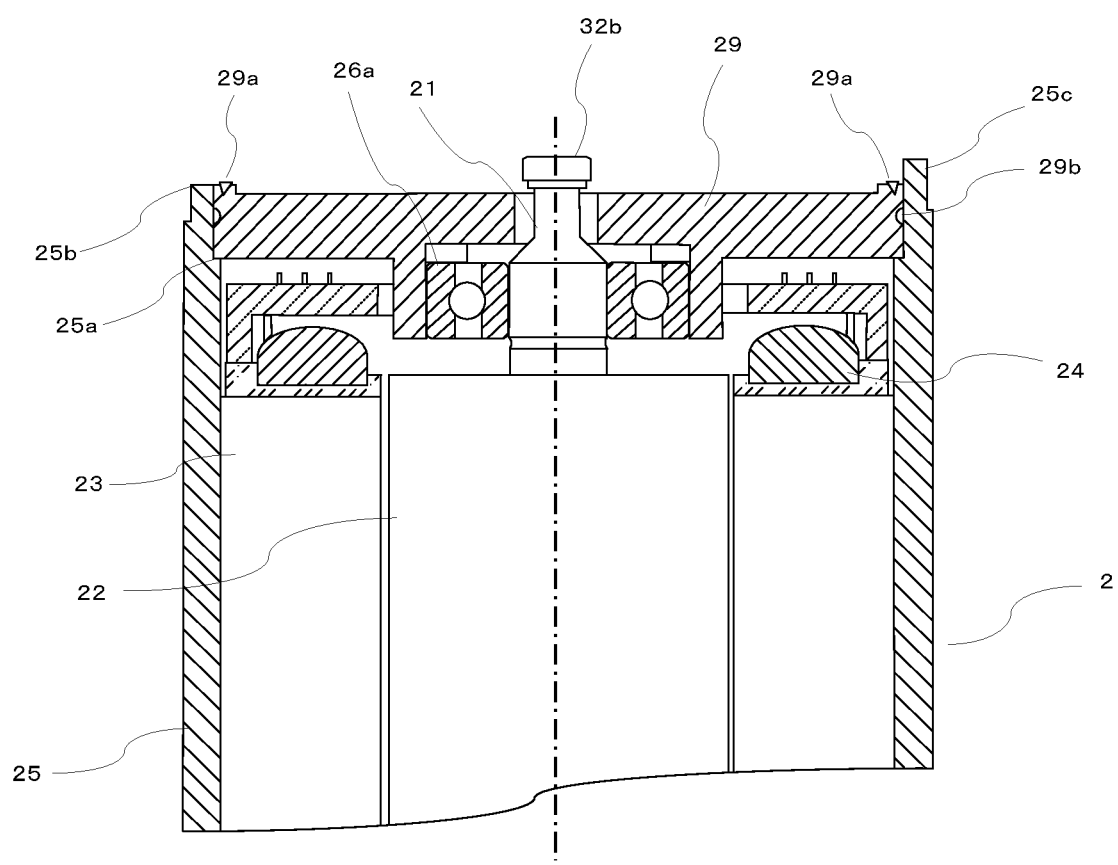
FIG. 2 is a partial cross-sectional diagram which indicates the electric power steering device according to Embodiment 1.

Hereinafter, the electric power steering device will be minutely explained in reference to a partial cross-sectional diagram in FIG. 2. FIG. 2 indicates a cross-sectional diagram in which only an upper portion of the motor 2 is enlarged. In FIG. 2, a state is indicated in which the stator 23 is pressed and inserted to the case 25, and the frame 29, by which the first bearing 26*a* is held, is inserted so as to be arranged at upper portion in FIG. 2. In addition, a facing surface of the switching element 31 of the frame 29, which is indicated in FIG. 1, is schematically indicated in a plane plate state. A concave portion, which includes the step portion 25*a*, is provided at an inner circumference of an upper surface of the case 25, and a corner portion of an outer circumference of the frame 29 is arranged in such a way that the corner is stored in the concave portion. Moreover, a diameter of the frame 29 is set in a state where the diameter of the frame 29 is very slightly smaller than a diameter of the concave portion at the inner circumference of the case 25. Thereby, it can be realized that a force for pressing and inserting, which is required when the frame 29 is housed in the case 25, is smaller than a force for pressing and inserting the stator 23 to the case 25. A position of the frame 29 in an axis direction is restrained by using the step portion 25*a*.

Moreover, the accuracy of the axis center of the first bearing 26*a* is secured by arranging the outer circumference of the frame 29 and the hole in such a way that a center of the hole, which is provided at a central portion of the frame 29, is matched to the axis center of the first bearing 26*a*. Therefore, the frame 29 is inserted with a size relation, in which an inner circumference of the case 25 is contacted to the outer circumference of the frame 29, so that a bulge, a distortion or the like is not caused at both of the case 25 and the frame 29. The case 25 and the frame 29 are set at a contact state in which the inner circumference of the case 25 and the outer circumference of the frame 29 are not pressed and not inserted, so that a position accuracy of the axis center is secured in accordance with a position relation between both of the inner circumference of the case 25 and the outer circumference of the frame 29. Moreover, a size of a diameter of the outer circumference of the frame 29 is not different from a size of a diameter of the inner circumference of the case 25. In other words, a gap between the frame 29 and the case 25 is not almost formed. Therefore, it can be prevented that trash is shifted.

If the frame 29 is pressed and inserted by using a similar way in which the stator 23 is pressed and inserted, an end portion of a particular upper surface of the case 25 is bulged, and there is a possibility in which a distortion is caused, so that a fitting accuracy with respect to the control unit 1 is influenced. Therefore, when the frame 29 is attached to the case 25, a pressing and inserting process is not used, and a touching process at a contact extent is used.

In order to prevent that the frame 29 is shifted, with respect to the case 25, in an upper direction or in a diameter direction, the caulking 29*a* is provided at a plurality of positions near an outer circumference at an upper side of the frame 29, and an outer circumference of the frame 29 and an inner circumference of the case 25 are strongly fixed and bonded, whereby a relative shifting operation of the outer circumference of the frame 29 and the case 25 is restrained. Moreover, a groove 29*b*, which has a schematic semicircular shape, of which a cross section is small, or an arbitrary shape, is provided at an outer circumference face, of the frame 29, which is contacted to an inner wall surface of the case 25, in such a way that the groove 29*b* surrounds a circumference.

The groove 29*b* is provided in order to hold the trash which is passed through a gap between the case 25 and the frame 29. In other words, when the frame 29 is attached to the case 25 in a state where a minute gap is formed, a material (for example, an aluminum material), which has a good heat transfer capability, is used for the frame 29, so that there is a case in which the frame 29 is scraped off when the frame 29 is inserted to the case 25, and a conductive foreign material, such as a scraped residue, is stored in the groove 29*b*, whereby it is prevented that the foreign material invades a control unit 1 side. It is desirable that a depth or a width of the groove 29*b* is smaller than a size of a trash or a scrap, which can be permitted. A position of the groove 29*b* is set at an upper side (a control unit 1 side) of a corner portion of the frame 29 and at a lower side with respect to a position of the caulking 29*a* when the groove 29*b* is contacted to the step portion 25*a* of the case 25, whereby an influence, which is supplied, by a deformation which is caused at the caulking 29*a* of the frame 29, to a pressure insertion surface, can be minimally suppressed. In addition, not only one groove 29*b* but also a plurality of grooves 29*b* is formed in a circular shape, whereby it can be more prevented that the foreign material invades the control unit 1 side.

In FIG. 2, an axis of the output shaft 21 is set at a central position, and a case of a configuration is indicated, at a left side, in a state where a height of an upper portion 25*b* of an edge of the case 25 is nearly identical to a height of the frame 29, and a case is indicated, at a right side, in a state where a height of an upper portion 25*c* of an edge of the case 25 is higher than the height of the frame 29. However, the upper portion 25*b* and the upper portion 25*c* are illustrated in order to indicate the cases in which even if a height of the case 25 is identical to the height of the frame 29, and even if the height of the case 25 is higher than the height of the frame 29, an influence is not caused with respect to the caulking 29*a* of the frame 29, and the height of the case 25 at the left side is not dared to be different from the height of the case 25 at the right side.

In the electric power steering device according to Embodiment 1, the inner circumference of the case 25 and the outer circumference of the frame 29 are not pressed and not inserted, and the frame 29 is housed into the case 25 in a state where the frame 29 tightly adheres to the case 25 at a contacting extent, and a plurality of caulking 29*a* are provided at the outer circumference of the frame 29, so that an accuracy of an axis center of both of the frame 29 and the case 25 can be secured. Moreover, the groove 29*b* is provided, so that it can be inhibited that a conductive foreign material is shifted to the control unit 1 side when the frame 29 is inserted. Furthermore, the both of the case 25 and the frame 29 are configured by using an identical material, whereby a thermal expansion and a contraction of the both of the case 25 and the frame 29 are integrally performed, so that a deformation, which is caused in accordance with a temperature variation, can be reduced as much as possible. In particular, in a case of the electric power steering device, the electric power steering device has problems in which the heat is generated from the motor 2 in itself, and an area for escaping the heat is not secured in the integrated control unit 1, and moreover, there is a case in which an automobile is used in a severe environment, so that a configuration, by which a problem, which is caused by the heat, can be resolved, is used as a required configuration in order to maintain a heat radiation capability of a high-integrated electronic circuit.

Embodiment 2

Figure 3:
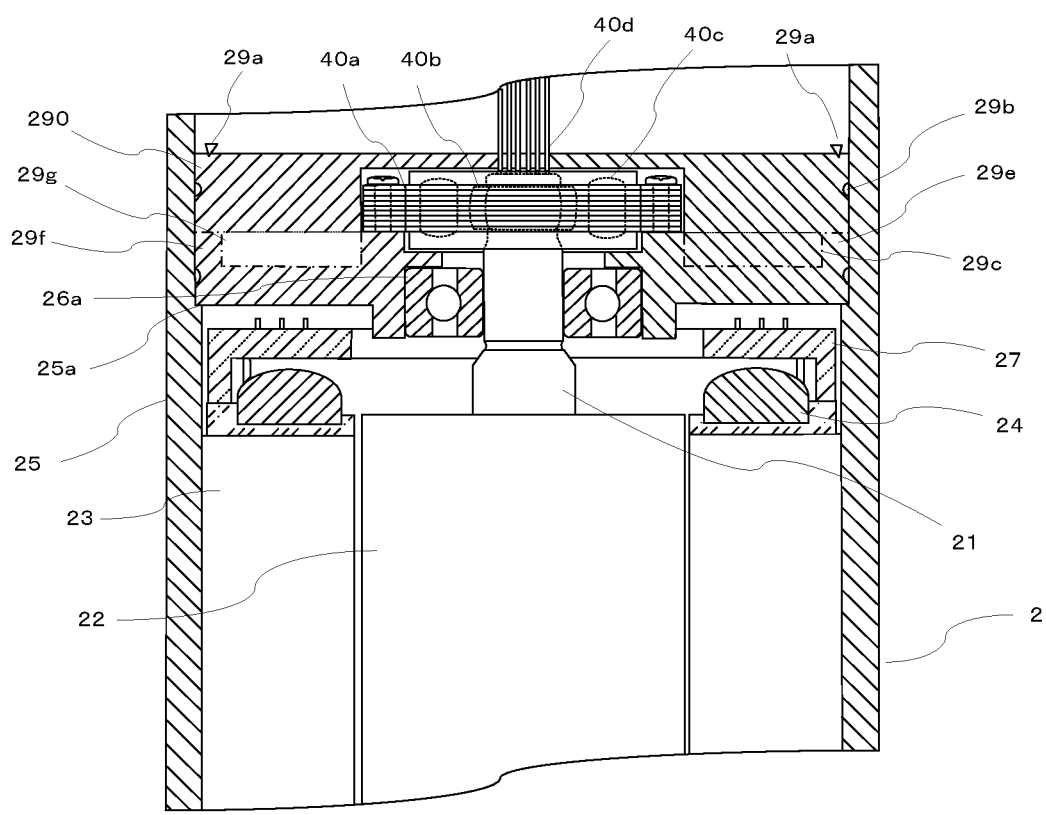
FIG. 3 is a partial cross-sectional diagram which indicates an electric power steering device according to Embodiment 2.

An electric power steering device according to Embodiment 2 will be explained. FIG. 3 is a partial cross-sectional diagram which is similar to a partial cross-sectional diagram in FIG. 2. In FIG. 3, each of the same symbols is supplied to the same or equivalent part which is explained in Embodiment 1. A rotation sensor portion in FIG. 3 is greatly different form a rotation sensor portion in FIG. 2.

In other words, at a tip of an output shaft 21, an appearance is indicated in a state where a first bearing 26a, and moreover, a core 40a, a rotor 40b, a detection wiring 40c which is wound around the core 40a, and a signal line 40d for exciting the detection wiring 40c and for outputting a detected wave form, which are used as a resolver-mode rotation sensor, are extended to a control unit 1.

In order to hold the first bearing 26a, the detection wiring 40c, and the core 40a, a frame 290 is inserted to a step portion 25a of a case 25. In this case, the frame 290 is formed as two layers configuration which is composed of an upper frame 29e and a lower frame 29f. A middle area 29c of the frame 290 indicates a boundary of both of the upper frame 29e and the lower frame 29f. A caulking 29a is provided at a plurality of positions near an outer circumference of the upper frame 29e.

As described in Embodiment 2, when the frame 290 is formed as the two layers configuration, a groove 29b is provided at each of an outer circumference surface of the upper frame 29e and an outer circumference surface of the lower frame 29f, whereby a conductive foreign material, such as a scraped residue, which is caused when each of the upper frame 29e and the lower frame 29f is inserted, can be stored in the groove 29b.

In addition, a diameter of the upper frame 29e is nearly identical to a diameter of the lower frame 29f, and a movement in an axis direction of the upper frame 29e is restrained, via the lower frame 29f, by using the step portion 25a of the case 25, so that the caulking 29a is provided at the upper frame 29e, whereby the upper frame 29e is also similarly fixed in an axis direction and a circumference direction. Moreover, although it is suitable that a contact state of the upper frame 29e with respect to an inner wall surface of the case 25 is identical to a contact state of the lower frame 29f with respect to the inner wall surface of the case 25, the caulking 29a is provided at the upper frame 29e, and the upper frame 29e is fixed to the case 25, so that it is suitable that the contact state of the lower frame 29f is less than the contact state of the upper frame 29e (a state in which a gap is wide). In other words, a diameter of a second frame is nearly identical to a diameter of a first frame in a state where the second frame and the first frame are formed as the two layers configuration, and the connecting portion is provided at only the frame which is faced to the control unit 1.

When the frame 290 is formed as the two layers configuration, although an attachment processing and an assembly processing of the rotation sensor portion can be easily performed, it is required that the middle area 29c secures an adhesion capability in such a way that the upper frame 29e and the lower frame 29f are evenly contacted. Moreover, space 29g can be also provided in the frame 290, and the space 29g can be used in order to reduce a capacity and a weight of the frame 290 in itself. On the other hand, when the frame 290 is formed as an integrated configuration, an attachment processing of the rotation sensor portion and a cutting process of both of surfaces for an attachment processing of the first bearing 26a are required. Even if either the two layers configuration or the integrated configuration is used, a contact extent between an outer circumference of the frame 290 and an inner circumference of the case 25 is loosened, and the connecting portion is provided at a position near the outer circumference of the frame 290 in order to fix the frame 290, whereby there is an effect in which an accuracy of an axis center can be secured.

As described above, although the embodiments of the present invention are described, the present invention is not limited to the embodiments, and various design modifications can be performed, and in the scope of the present invention, each of the embodiments can be freely combined, and moreover, each of the embodiments can be suitably modified or omitted.

What is claimed is:

1. An electric power steering device comprising:
    a case;
    a motor which is housed in the case;
    a control unit which is housed in the case; and
    a frame which compartmentalizes the motor and the control unit; wherein
    a movement of the frame is restrained by using a step portion, which is provided at an inner wall surface of the case in a state where a corner portion of the frame is contacted to the step portion, and a connecting portion at which an outer circumference of the frame and an inner circumference of the case are fixed and bonded by a caulked joint,
    wherein a groove is provided at an outer circumference surface, of the frame, which is contacted to an inner wall surface of the case,
    wherein the groove is positioned away from axial end surfaces of the frame, and
    wherein an empty space is provided in the groove, and
    wherein a diameter of the outer circumference surface of the frame is smaller than a diameter of an inner circumference surface of the case.

2. An electric power steering device as recited in claim 1, wherein an insertion force for the frame is low with respect to a pressure by which the motor is inserted to the case.

3. An electric power steering device as recited in claim 1, wherein a bearing, by which an output shaft of the motor is held, is included at a central position of the frame, and the connecting portion is provided at a surface near an outer circumference of the frame at an opposite side with respect to a hold side of the bearing.

4. An electric power steering device as recited in claim 1, wherein the frame is used as a heat sink by which heat, which is generated from the control unit, is radiated.

5. An electric power steering device as recited in claim 1, wherein a hole, which penetrates in a state where an insulation distance is secured with respect to a conductor by which the control unit and the motor are connected, is included at the frame.

6. An electric power steering device as recited in claim 1, wherein a hole is provided at a central portion of the frame, and an output shaft of the motor penetrates the hole so as to be arranged, and a rotation sensor portion, by which a rotation is detected, is provided at a tip of the output shaft.

7. An electric power steering device as recited in claim 6, wherein the frame is formed as two layers configuration which is composed of a first frame, by which a bearing of the output shaft is held, and a second frame, by which a component, which is related to the rotation sensor portion, is held.

8. An electric power steering device as recited in claim 7, wherein a diameter of the second frame is nearly identical to a diameter of the first frame in the two layers configuration, and the connecting portion is provided at only the frame at a side which is faced to the control unit.

9. An electric power steering device as recited in claim 1, wherein the groove is semicircular in cross-section.

* * * * *